3,070,589
CATALYST REMOVAL FROM POLYOLEFIN
POLYMER SOLUTIONS
William Kirch, Cincinnati, and Ragnar S. Solvik, Wyoming, Ohio, assignors to National Distillers and Chemical Corporation, New York, N.Y., a corporation of Virginia
No Drawing. Filed Oct. 30, 1958, Ser. No. 770,594
5 Claims. (Cl. 260—94.9)

This invention is broadly concerned with a novel method for recovery and purification of polymers and more specifically, with a method for handling and removal of metallic catalyst residues from polymerization reaction mixtures.

It is an object of this invention to provide a method for effective deactivation of metallic polymerization catalysts and efficient removal thereof from polymer solutions.

It is another object of this invention to provide a method for deactivation and agglomeration to metallic residues in polymer solutions and removal thereof.

It is a further object to remove ash-forming metallic residues from polymer solutions by deactivation and agglomeration thereof.

Other objectives of the process of this invention will be apparent from the detailed description below.

There are a relatively large number of processes known in which olefinic reactants including alpha olefins, such as ethylene, propylene and the like are subjected to polymerization using either the monomer singly or in combination with various metallic compounds. A great number of these metal bearing polymerization catalysts are well known and are frequently combination catalysts consisting of more than one metal-containing compound. In many instances, it has been shown that at least two different materials, both metal-containing compounds, are required to form active polymerization catalysts. These are generally classed as: (1) the cocatalyst, or the reducing agent, and (2) the catalyst, or a metallic compound in a multivalent state. The cocatalyst or reducing agent may be, for example, metal alkyls or aryls, metal hydrides, Grignard reagents, and alkali metals or alkaline earth metals. Some of the more successfully used cocatalysts are triethylaluminum, tetrabutyltin, amylsodium, diethylmagnesium, sodium, sodium hydride, etc. The catalyst or metallic compund may be, for instance, a titanium or zirconium halide such as the tetrachloride or the tetrabromide, vanadium tetrachloride, hafnium or thorium tetrahalide, hexavalent chromium compounds, and the like. Examples of known satisfactory coordination catalyst systems include titanium tetrachloride-aluminum triethyl, titanium tetrachloride-ethyl magnesium bromide, and titanium tetrachloride-lithium aluminum tetrabutyl, and there are many others known in the art.

Some of the most active catalyst complexes are formed from liquid or organosoluble metallic catalysts and cocatalysts, since more centers are provided for the formation of the active catalyst. Generally, however, the active catalyst formed by the reduction (co-catalytic) of the catalyst is a finely dispersed solid. It is believed but not necessarily proved that coordination complexes are formed in the polymerization mixture or in the catalyst-cocatalyst mixture. While the chemical nature of these complexes is not known, it is believed that they are the active catalysts or catalyst components which initiate the polymerization of the monomers.

In spite of the above, it is not always necessary to have catalyst combinations and in some catalytic polymerizations, a single finely divided metal or metallic compound is employed as catalyst, including such metals and metallic compounds as the finely dispersed alkali metals, aluminum trihalides, boron halides, vanadium halides, titanium and zirconium halides, metallic hydrides, alkali metal alkyls and aryls, chromium and molybdenum oxides, and the like.

In some of these polymerizations, the reaction is carried out as a homogeneous reaction in a diluent and/or solvent in which the reactants and the final polymer are essentially soluble. For example, in the polymerization of ethylene under conditions of moderate temperatures and low pressures, reaction conditions can be selected such that the polymer product is in solution in the solvent and a homogeneous reaction mixture is obtained.

In many cases, the catalyst is essentially not soluble, however, and is present at the end of the polymerization cycle in very finely divided form. This metallic catalyst residue must be deactivated and removed from the finished polymer solution. Both the deactivation and removal must be as complete as possible. If deactivation is not effective and complete, other undesirable side-reactions take place such as after-polymerization reactions and catalytic degradation of the polymer.

In other cases, the polymerization reaction may be carried out at relatively low temperatures and pressures so that the polymer product is not in solution and a heterogeneous reaction mixture results. In these cases, the unsoluble catalyst residues must be deactivated and converted to a form that can be separated from the polymer suspension.

If the catalyst removal is not complete, then metallic, ash-forming and color-forming residues will inevitably be present in the final polymer. Although one of the most economical and efficient methods for removal of such residues would be by filtration or other gravity separations, this is not always feasible or effective since by the very nature of the material and its use, these metallic catalytic materials are generally in very finely divided and well dispersed form and are not removable directly by filtration.

In a series of comparative studies for developing suitable deactivating and agglomerating agents for the active catalyst to render it filterable, it has been found that organic peroxides are very efficient agents. Typical organic peroxides which can be used for this purpose include t-butyl hydroperoxide, di-t-butyl peroxide, t-butyl peroxyacetate, t-butyl peroxy pivalents, cumene hydroperoxide, cyclohexyl hydroperoxide, di-benzoyl peroxide, di-acetyl peroxide, di-cetyl peroxide, t-butyl perbenzoate, peracetic acid and persuccinic acid. This list it not, however, intended to be limitive in nature and the invention is not to be considered as limited thereto.

In general, these compounds apparently serve to deactivate the metal-containing catalyst and also to change the physical structure or the metallic residues so that the solid particles agglomerate and form larger, filterable solids which give substantially faster settling rate and are thus separable from a polymer solution.

The use of the organic peroxide is critical and its effects on agglomeration and filtration of the polymer solution are surprising and totally unexpected. This is particularly true in view of the many similar and related compounds and materials which were tested and found to be substantially or totally useless. For example, many surfactants of varying classes of organic compounds were tried. These included sorbitan trioleate (Span), polyoxyethylene stearate (Myrj) and polyoxyethylene sorbitan monooleate (Tween). None of these had any substantial effect on filtration rate. A number of the polyols, including 1,2,6-hexanetriol, 2-ethyl-1,3-hexanediol, monopentaerythritol, and various derivatives thereof, were also tried without substantial effect on agglomeration and filtration rate. Also the synthetic flocculant aids were tested with no effect. Both triethyl and tributyl citrate gave colored precipitates which did not filter satisfactorily. It is particularly surprising that surfactants and flocculating agents such as the above were of little or no effect in the deactivation and agglomeration of these metallic residues.

It is an additional and further feature of this invention to add to the polymer solution containing metallic residue an amount of hydrogen peroxide in the range of 1–100 weight percent based on weight of total catalyst with a preferred range of 2–5%. It has been found for instance, that such addition of hydrogen peroxide causes formation of larger agglomerates which are readily filterable.

It is contemplated that the organic peroxide should be used in the amount required to effectively deactivate and agglomerate the metallic catalysts. Thus, it is somewhat difficult to define exact limits of concentrations necessary but generally, these amounts are from 100 to 500 wt. percent based on weight of total catalyst.

Too little of the organic peroxide obviously will not have the desired effect and too great an amount will be uneconomical and may have undesirable effects such as oxidation and degradation of the polymer.

It is a further feature of this invention to include with the deactivated polymer solution a mechanical filtration aid, in the event that a filtration step is carried out subsequently. This is, of course, unnecessary if the final separation of the agglomerated catalyst residues is done by gravity settling or by centrifugation. However, if filtration is done, as is preferred for commercial operations, then it is highly desirable to add filtration aids such as diatomaceous earth, fuller's earth, wood-pulp, activated carbon or asbestos pulp.

Following deactivation, agglomeration, and removal of the metallic residues, the polymer solutions are handled by the well-known methods and in any convenient manner to separate and recover the polymer and the solvent.

The invention will be further described and illustrated by the following specific examples, but it is intended in no way to limit the invention thereto.

EXAMPLE 1

In the process used in the following described examples of catalyst removal, purified ethylene, purified solvent and dilute solutions of catalyst and cocatalyst were injected into a continuous, stirred reactor operating at about 240° C. and 2500–3500 lbs. per square inch pressure (p.s.i.g.). The residence time in the reactor, required to convert the ethylene to polyethylene was 10–20 minutes. Following polymerization, the deactivation-agglomeration agents (sometimes filter aid also) were injected into the effluent from the reactor and after sufficient time was allowed for the deactivating reaction to take place, the combined stream was sent to a battery of sintered metal filters. The polymer-solvent stream was then reduced in pressure to 20 p.s.i.g. into a separator which permitted the solvent to vaporize. The solvent-free polymer was collected from the bottom of the separator and subjected to analytical characterization. Experimental data on four runs are shown in Table I.

*Table 1*

| Runs | 1 | 2 | 3 | 4 |
|---|---|---|---|---|
| Ethylene feed rate, lbs./hr | 2.0 | 2.0 | 3.2 | 2.0 |
| Solvent feed rate, lbs./hr | 40.0 | 40.0 | 30.0 | 40.0 |
| Catalyst type | $TiCl_4$ | $TiCl_4$ | $TiCl_4$ | $TiCl_4$ |
| Cocatalyst type | $Al(C_2H_5)_3$ | $Al(C_2H_5)_3$ | $Al(C_2H_5)_3$ | $Al(C_2H_5)_3$ |
| Cat. feed rate, lbs./hr. of a 1% conc | 0.84 | 0.82 | 0.72 | 0.83 |
| Cocat. feed rate, lbs./hr. of a 1.1% conc | 0.84 | 0.82 | 0.69 | 0.83 |
| Cocat./cat. wt. ratio | 1.1 | 1.1 | 1.05 | 1.1 |
| Percent conversion of monomer to polymer | 70 | 65 | 55 | 70 |
| Reactor pressure (p.s.i.g.) | 3,500 | 2,500 | 2,550 | 2,500 |
| Reactor temperature (° C.) | 240 | 240 | 230 | 240 |
| Deactivator (I) type | t-BHP [1] | t-BHP | t-BHP | None |
| Deactivator (II) type | $H_2O_2$ | $H_2O_2$ | None | Do. |
| Deactivator (I) feed rate, lbs./hr. of 2.0% conc | 2.4 | 2.05 | 2.3 | |
| Deactivator (II) feed rate, lbs./hr. of .04% conc | 2.4 | 2.05 | None | |
| Wt. ratio of deactivator (I) to total catalyst | 2.7 | 2.25 | 2.6 | |
| Wt. ratio of deactivator (II) to total catalyst | 0.054 | 0.045 | 0 | |
| Ratio of filter aid to total catalyst | 0.14 | None | 0 | |
| Percent total catalyst in polymer before filtration | 0.6 | 0.62 | 0.38 | 0.58 |
| Percent total catalyst in polymer after filtration | 0.0036 | 0.0070 | 0.040 | 0.45 |
| Polymer melt index | 1.82 | 1.72 | 1.65 | 1.8 |
| Polymer density | 0.958 | 0.959 | 0.959 | 0.958 |
| Polymer ash content, p.p.m | 36 | 70 | 400 | 4,500 |
| Polymer color | White | White | Off-white | Dark brown |

[1] t-Butylhydroperoxide.

EXAMPLE 2

Table II shows comparative results obtained by various methods for deactivation and agglomeration of a $TiCl_4$-$AlEt_3$ catalyst in a Decalin solution. The relative effectiveness of the catalyst was measured in each instance by the sediment height in milliliters for a 40 milliliter sample after varying and increasing periods of time as indicated after treatment with the stated deactivator-agglomerator combinations. The first four experiments are typical examples of the invention showing the surprising effectiveness of the organic peroxide and hydrogen peroxide either with or without filtering aid and the poor results obtained in their absence. The results obtained when the organic peroxide or hydrogen peroxide is used alone with the filter aids and when the filter aid is used alone are shown.

Table II

| Catalyst deactivator/agglomerator | Settling time, hours | Sediment height for 40 ml. sample (ml.) |
|---|---|---|
| 1. t-butylhydroperoxide+H₂O₂ (t-BHP) | 0<br>0.25<br>1 | 40<br>8<br>6 |
| 2. t-BHP+H₂O₂+filter aid (type 1)ᵃ | 0<br>0.25<br>1 | 40<br>(3+)<br>5 |
| 3. t-BHP+H₂O₂+filter aid (type 2)ᵇ | 0<br>0.25<br>1<br>6<br>18 | 40<br>12<br>11<br>9.5<br>9.5 |
| 4. t-BHP+H₂O₂+filter aid (type 2) | 0<br>0.25<br>1<br>3<br>22 | 40<br>11.5<br>11.5<br>10.5<br>10.5 |
| 5. H₂O₂+filter aid (type 2) | 0<br>0.25<br>1<br>2.5 | 40<br>11<br>10.5<br>10.5 |
| 6. H₂O₂+filter aid (type 1) | 0<br>0.50<br>1<br>3 | 40<br>(5+)<br>6<br>6 |
| 7. t-BHP+filter aid+H₂O₂ (½ conc. of 1. above) (type 1). | 0<br>0.25<br>1<br>3<br>22 | 40<br>11<br>10<br>9<br>7.5 |
| 8. t-BHP+filter aid (type 1) | 0<br>0.25<br>1<br>8 | 40<br>17<br>12.5<br>7.0 |
| 9. t-BHP+filter aid (type 2) | 0<br>0.25<br>1<br>0<br>1<br>16 | 40<br>20<br>15<br>40<br>19<br>9.5 |
| 10. filter aid (type 1) | 0<br>1.5<br>17 | 40<br>40<br>20 |
| 11. blank (active catalyst exposed only to air). | | |

ᵃ Diatomaceous earth.
ᵇ Diatomaceous earth plus asbestos fibers.

What is claimed is:

1. A method for deactivation and agglomeration of metallic catalyst residues from a polymerization reaction mixture wherein the polymer is substantially in solution and in which the catalyst comprises at least two components, (1) a cocatalyst and (2) a catalyst, at least one component of which produces metallic residues, and the resulting polymerization reaction mixture contains polymer from at least one olefinic reactant, which consists of adding thereto an organic peroxide, as the sole deactivating and agglomerating agent, in an amount sufficient to effectively deactivate and agglomerate all metallic catalyst residues, and separating the deactivated, agglomerated catalyst residues therefrom.

2. The method of claim 1 in which the organic peroxide is a t-butyl hydroperoxide and it is added to said polymer reaction mixture in an amount between 100 and 500 weight percent of total catalyst.

3. The method of claim 1 in which a mechanical filtering aid is added to the polymer solution prior to filtration.

4. A method for deactivation and agglomeration of metallic catalyst residues from a polymerization reaction mixture wherein the polymer is substantially in solution and in which the catalyst comprises at least two components, (1) a cocatalyst and (2) a catalyst, at least one component of which produces metallic residues, and the resulting polymerization reaction mixture contains polymer from at least one olefinic reactant, which consists of adding thereto an organic peroxide, in an amount between 100 and 500 weight percent of total catalyst, and hydrogen peroxide, in an amount between 2 and 5 weight percent of total catalyst, said peroxides being the sole deactivating and agglomerating agents, and separating the deactivated, agglomerated catalyst residues from the thus treated polymerization reaction mixture.

5. The method of claim 4 in which the organic peroxide is t-butyl hydroperoxide.

References Cited in the file of this patent

UNITED STATES PATENTS

| 2,827,445 | Bartolomeo et al. | Mar. 18, 1958 |
| 2,845,414 | Schultze | July 29, 1958 |
| 2,849,429 | Cines | Aug. 26, 1958 |